United States Patent
Marvasti (10) Patent No.: US 8,060,342 B2
(45) Date of Patent: *Nov. 15, 2011

(54) SELF-LEARNING INTEGRITY MANAGEMENT SYSTEM AND RELATED METHODS

(75) Inventor: Mazda A. Marvasti, Rancho Santa Margarita, CA (US)

(73) Assignee: Integrien Corporation, Irvine, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/857,369

(22) Filed: Aug. 16, 2010

(65) Prior Publication Data

US 2010/0318487 A1    Dec. 16, 2010

Related U.S. Application Data (60) Continuation of application No. 12/270,535, filed on Nov. 13, 2008, now Pat. No. 7,801,703, which is a division of application No. 11/535,818, filed on Sep. 27, 2006, now Pat. No. 7,467,067.

(51) Int. Cl.
  *G06F 11/30* (2006.01)
  *G06F 11/00* (2006.01)
(52) U.S. Cl. ........ 702/186; 702/187; 702/185; 702/181; 714/37; 714/47
(58) Field of Classification Search .................. 702/186, 702/181, 187, 185
See application file for complete search history.

(56) References Cited

U.S. PATENT DOCUMENTS

| | | | |
|---|---|---|---|
| 5,067,099 A | 11/1991 | McCown et al. | |
| 5,835,902 A | 11/1998 | Jannarone | |
| 5,838,242 A * | 11/1998 | Marsden | 340/628 |
| 6,216,119 B1 | 4/2001 | Jannarone | |
| 6,289,330 B1 | 9/2001 | Jannarone | |
| 6,327,677 B1 | 12/2001 | Garg et al. | |
| 6,427,102 B1 * | 7/2002 | Ding | 701/34 |
| 6,453,346 B1 | 9/2002 | Garg et al. | |
| 6,591,255 B1 | 7/2003 | Tatum et al. | |
| 6,609,083 B2 | 8/2003 | Enck et al. | |
| 6,647,377 B2 | 11/2003 | Jannarone | |
| 7,032,119 B2 * | 4/2006 | Fung | 713/320 |
| 7,107,339 B1 * | 9/2006 | Wolters | 709/224 |
| 7,296,070 B2 | 11/2007 | Sweeney et al. | |
| 7,333,851 B2 | 2/2008 | Echauz et al. | |
| 7,453,052 B2 * | 11/2008 | Midgley | 219/448.19 |
| 7,467,067 B2 | 12/2008 | Marvasti | |
| 7,519,564 B2 | 4/2009 | Horvitz | |
| 7,801,703 B2 * | 9/2010 | Marvasti | 702/186 |
| 2005/0177353 A1 * | 8/2005 | Slater | 703/6 |
| 2006/0129606 A1 | 6/2006 | Horvitz et al. | |
| 2007/0005297 A1 * | 1/2007 | Beresniewicz et al. | 702/181 |
| 2007/0005761 A1 | 1/2007 | Wolters | |
| 2007/0044082 A1 * | 2/2007 | Sauermann et al. | 717/151 |
| 2007/0067678 A1 * | 3/2007 | Hosek et al. | 714/25 |

* cited by examiner

*Primary Examiner* — Hal Wachsman (57) ABSTRACT

An integrity management system predicts abnormalities in complex systems before they occur based upon the prior history of abnormalities within the complex system. A topology of the nodes of a complex system is generated and data is collected from the system based on predetermined metrics. In combination with dynamic thresholding, fingerprints of the relevant nodes within a complex system at various time intervals prior to the occurrence of the abnormality are captured and weighted. The fingerprints can then be applied to real-time data to provide alerts of potential abnormality prior to their actual occurrence.

17 Claims, 2 Drawing Sheets

FIG. 3

SELF-LEARNING INTEGRITY MANAGEMENT SYSTEM AND RELATED METHODS

RELATED APPLICATION

This application is a continuation application of and claims the Paris Convention priority of U.S. Utility application Ser. No. 12/270,535, filed Nov. 13, 2008 and issued as U.S. Pat. No. 7,801,703, which is a divisional application and claims the Paris Convention priority of U.S. Utility application Ser. No. 11/535,818, filed Sep. 27, 2006 and issued as U.S. Pat. No. 7,467,067, the contents of both are incorporated by reference herein in their entirety.

TECHNICAL FIELD

The present disclosure relates to a system for analyzing variations in complex systems that occur over time and, more particularly, to a system and method for providing integrity management through the real-time monitoring of such variations and the alerting of potential effects from such variations before such effects occur.

BACKGROUND

Complex systems are all around us. From weather to ecosystems to biological systems to information technology systems, various tools have been developed in attempt to study and understand these systems in detail, mainly through the use of computer-analyzed data. Using computers, information may be analyzed and presented for human consumption and understanding, even when dealing with complex systems. These computerized tools allow variables in complex systems to be analyzed ranging from biological systems, traffic congestion problems, weather problems, information technology systems and problems, and complex systems that would otherwise be too information rich for human understanding.

As the volumes of information regarding complex systems have increased, the tools for efficiently storing, handling, evaluating, and analyzing the data have evolved. For all of their power in accomplishing these tasks, however, existing tools to date suffer from an inherent inability to predict future events with accuracy in these complex systems. The problem with prior approaches is that computers are only capable of performing the tasks they are programmed to analyze. Consequently, in order to have a computer evaluate and predict outcomes in complex systems, computers must be programmed and instructed how to make the predictions. However, humans must first have a core understanding of the variables at play in a complex system in order to tell the computer how to predict outcomes. In most cases, the human operators are not able to instruct the computer how to model each variable in a complex system with enough precision to tell the computer how to make the predictions. Moreover, many variables in complex systems exhibit behavioral changes depending on the behavior of other variables. Thus, what is needed is a tool that allows humans to evaluate the variables without a complete understanding of every variable at play. In other words, there is a need to establish the ability to generate sui generis truth rules about predicates outside of the limitations of human consciousness and awareness.

Of particular importance are variations that occur within complex systems, such as abnormalities or problems. For instance, in the case of an information technology (IT) infrastructure, these variations from normal or expected operation could lead to failures, slowdown, threshold violations, and other problems. Often, these types of problems are triggered by unobserved variations or abnormalities in one or more nodes that cascade into larger problems until they are finally observable. Prediction of these of variations from the expected can require an understanding of the underlying causes, which may only be observable by accounting for the behaviors of the variables in substantially real-time. Moreover, the more remote in time from the event leading to the variation, the more sensitive the relevant analysis must be to detect the underlying causes. As a result, many tools currently used to address abnormalities in complex systems work close to the time the problem is actually observed to humans. Other tools are based on inefficient thresholding systems that address the potential abnormality when the probability that the abnormality will lead to an actual problem remains small, which triggers responses in many cases where a response is not actually merited.

Existing thresholding systems provide an inefficient and ineffective tool for predicting problems before they actually occur within enough time to address the underlying abnormality so as to be able to prevent the problems, because these systems are generally incapable of differentiating between a minute deviation from normal operational behavior (e.g., a "spike") and deviating trends, which are often indicative of an abnormality. However, because these systems do not address the causes and are activated in close time proximity to actual abnormalities, implementers often set the sensitivity of thresholding systems to be very sensitive, which often produces false-positive abnormality alerts and consequently creates inefficiencies in troubleshooting and addressing the abnormalities.

For abnormalities of nodes in complex systems, however, the sheer number of variables makes prediction of the abnormalities difficult. There is a need for a heuristic that utilizes thresholding functionality to provide a more efficient system for prediction and alleviation of abnormalities before they lead to problem events, without producing high rates of false positive abnormality alerts.

SUMMARY OF THE DISCLOSURE

An integrity management system and method is provided that monitors variations or abnormalities in complex systems, such as an IT infrastructure or other types of systems, to predict the occurrence of an event before the event occurs based upon similarities to a prior history of variations or abnormalities within the complex system. The integrity management system generates a topology of the nodes of the complex system and collects data from the system based on predetermined metrics. In one aspect, the predetermined metrics are selected from desired best practices for the system. A self-learning dynamic thresholding module is provided to assist in discovering when variations or abnormalities occur within the complex system. In combination with dynamic thresholding, fingerprints of the relevant nodes within a complex system at various time intervals prior to the occurrence of the abnormality are captured and weighted. The fingerprints can then be applied to real-time data to provide alerts of potential future events prior to their actual occurrence based on observed variations or abnormalities.

According to a feature of the present disclosure, a system is disclosed comprising, in combination a topology of nodes, a data collector, at least one heuristic generator that provides at least one heuristic, and an alerter, the alerter providing a notice of a potential abnormality prior to the occurrence of the potential abnormality and wherein data is collected by the data collector and compared to the at least one heuristic to provide a probability of a potential abnormality and wherein if the probability crosses a threshold value, the alerter provides the notice.

In one aspect, the present disclosure provides a system comprising, in combination, a computer, a topology of nodes, a data collector, at least one heuristic generator that provides at least one heuristic, and an alerter, the alerter providing a notice of a potential event prior to the occurrence of the potential event. Data is collected by the data collector and compared to the at least one heuristic to provide a probability of a potential event using the computer. Finally, if the probability crosses a threshold value, the alerter provides the notice.

In another aspect, the present disclosure provides a dynamic thresholding system comprising, in combination, at least one dynamically determined threshold associated with a metric, the dynamically determined threshold being changed at set intervals based on the metric's observed data for a historical time period; and a subsystem for detecting trend states, the trend state occurring when any dynamically determined threshold is exceeded continuously for a time period. If the subsystem detects a trend, an alert state is activated.

According to a feature of this disclosure, a dynamic thresholding system comprising, in combination a computer in data communication with an information technology infrastructure: a data collection module that collects metric data and stores the metric data on a storage device from at least one metric in an information technology infrastructure, and a dynamic threshold generator for creating a dynamic threshold based on a set of historical metric data, comprising: a model execution engine for analyzing the historical metric data based on at least one analytics model in an analytics model library; an analytics model library rule that defines parameters used by the model execution engine to form a transformed metric data set; and a trend detecting module for detecting a trend, the trend occurring when incoming metric data substantially exceeds the dynamic threshold for predetermined number of time slice. The dynamic threshold generated from the dynamic threshold generator is not static from one time slice to another time slice. Additionally, a resolution module causes an alarm when a trend is detected.

According to a feature of this disclosure, a machine-readable medium having instructions stored thereon executable by a processing unit comprising using a computer to: collect data from at least one metric and store the data, transform the data with at least one model from an analytics model library and at least one model library rule and storing the transformed data in a set of historical transformed data, determine a dynamic threshold for the at least one metric on a time slice by time slice basis by using the set of historical transformed data to generate a value describing a limit of normal functionality for each time slice, and modify the dynamic threshold periodically to reflect recent historical transformed data by replacing old data with more recent historical data in the set of historical transformed data.

According to a feature of this disclosure, a machine-readable medium having instructions stored thereon executable by a processing unit comprising using a computer to: collect data from at least one metric and storing the data, transform the data with at least one model from an analytics model library and at least one model library rule and storing the transformed data in a set of historical transformed data, determine a dynamic threshold for the at least one metric on a time slice by time slice basis by using the set of historical transformed data to generate a value describing a limit of normal functionality for each time slice, modify the dynamic threshold periodically to reflect recent historical transformed data by replacing old data with more recent historical data in the set of historical transformed data, comparing incoming metric data against the dynamic threshold for the corresponding time slice in which the incoming metric data is collected, and triggering an alert state when a trend is observed, wherein the trend comprises the value of the incoming metric data exceeding the dynamic threshold for a predetermined period of time.

DRAWINGS

The above-mentioned features and objects of the present disclosure will become more apparent with reference to the following description taken in conjunction with the accompanying drawings wherein like reference numerals denote like elements and in which.

DETAILED DESCRIPTION OF THE DISCLOSURE

As used in the present disclosure, the term "abnormality" shall be defined as behaviors of a components, nodes, or variables of a complex system that are unexpected as compared to a range of normal values. An "abnormality" may be indicative of a problem, aberrant behavior, inefficiency, improved behavior, or other behavior of interest.

As used in the present disclosure, a "node" shall be defined as a functional unit of a complex system.

As used in the present disclosure, an "event" shall be defined as an abnormal condition of a metric.

As used in the present disclosure, the term "exceed" used in the context of thresholds shall be defined as exceeding a maximum threshold value or dropping below a minimum threshold value.

As used in the present disclosure, a "metric" shall be defined as an atomic being measured in a complex system or in a transaction of the complex system, wherein an atomic is a fundamental entity within a system that can be measured.

As used in the present disclosure, a "heuristic" shall be defined to be a set of metric conditions or events describing the state of a complex system prior to the occurrence of an event, such as an abnormality or problem or other type of occurrence. A heuristic may be a record or rule of metric conditions or events at a given time or a combination of records or rules of the metric conditions or events over a time period prior to the occurrence of the abnormality.

As used in the present disclosure, a "transaction" will be defined as a grouping of nodes. Transactions may be subdivided into "subgroups."

Figure 1:
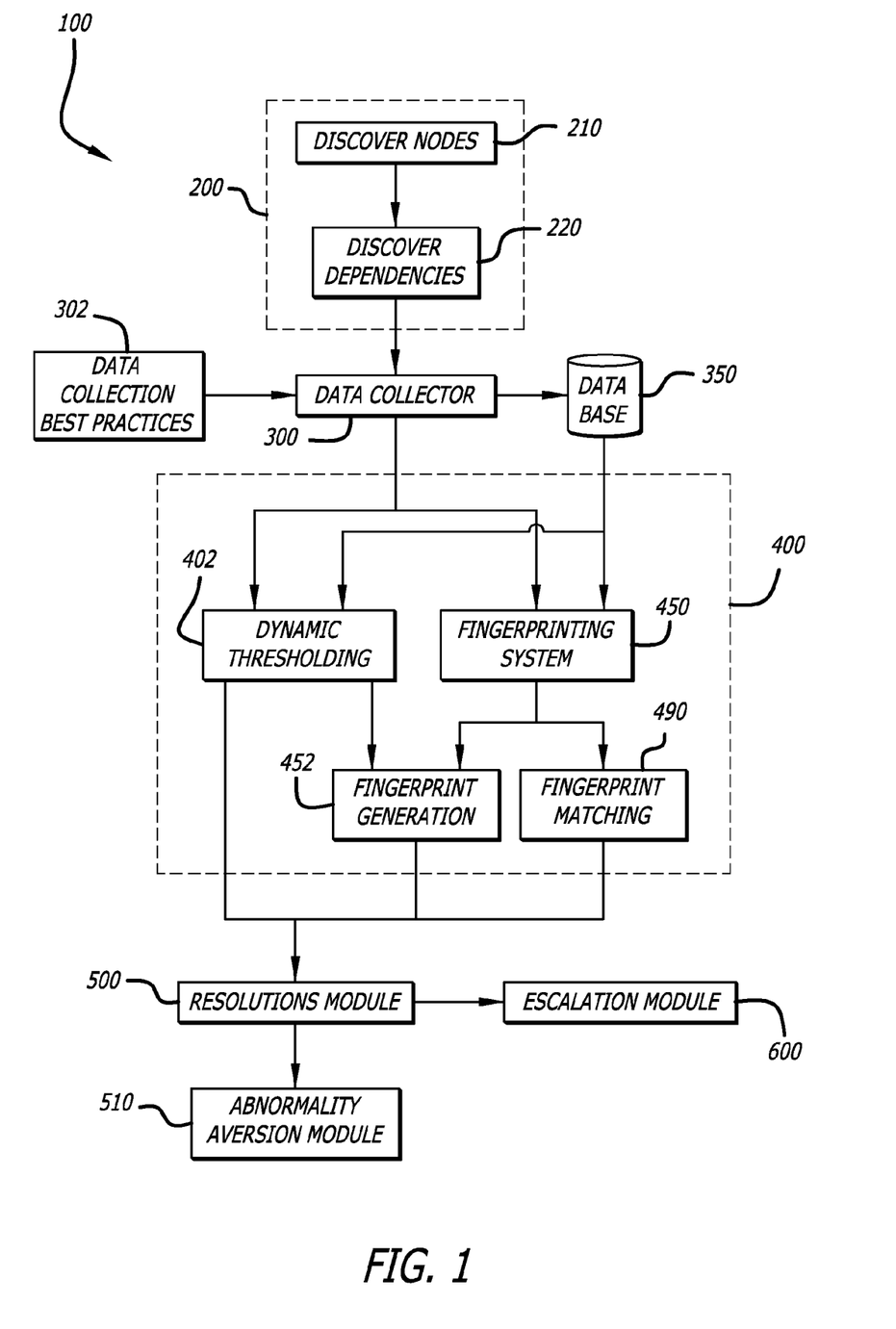
FIG. 1 is a block diagram of an embodiment of a self-learning integrity management system using a fingerprinting system and dynamic thresholding system to predict events prior to their occurrence.

Turning now to an illustrative, but not limiting, embodiment shown in FIG. 1, integrity management system 100 is shown. Integrity management system 100 comprises subsystems including topology mapper 200, data collection module 300, event prediction module 400, resolution module 500, and escalation module 600. The system 100 provides functionality from start to finish with the complex system to which it is applied, according to embodiments of the instant teachings. Those skilled in the art will readily understand that the combination of these devices may take on many other forms and combinations depending on the complex system and the goals regarding application of the present teachings to that system.

Topology mapper 200 is initially applied to a complex system to map out dependencies among variables. It comprises node discovery module 210, which discovers nodes within the complex system, and dependency discovery module 220, which maps the interdependencies of the nodes. Interdependency maps define which devices are connected and how the devices interconnected. In one aspect, the topology mapper 200 obtains a holistic view of the complex system. The result provides a topology of devices and their connectedness. Discovery of the nodes using node discovery module 210 and their interdependencies using dependency discovery module 220 may be done manually, with automated systems and software, or a combination thereof as known to a person of ordinary skill in the art.

According to an embodiment, an information technology (IT) infrastructure comprises the complex system. Nodes may be made up of devices, such as computer systems; components of computer systems, such as network interface cards (NICs), processors, memory devices, and storage devices; routers; and switches; for example. The interdependencies may occur between buses for the NICs, processors, memory devices, and storage devices within a given computer system. They may also comprise wired or wireless connections between NICs, routers, and switches, according to embodiments. The exact devices making up the nodes in a given topology will vary from topology to topology and will be known and understood by a person of ordinary skill in the art.

Similarly in an IT infrastructure environment, software applications may also comprise nodes for which a topology of interdependencies is desired. Nodes may represent software applications that are interconnected with other software applications. The interaction of these nodes often requires significant resources to ensure efficient operation. Artisans will know and understand the metric to select for software applications. Indeed, a holistic approach to an IT infrastructure may combine both hardware nodes and software nodes in a single topology, according to embodiments. Similar embodiments may focus exclusively on software application nodes or hardware application nodes depending on how integrity management system 100 is deployed.

Prior to collection of data using data collection module 300, according to embodiments, metrics must be chosen to monitor chosen variables within each node. The metrics are chosen based on desired measurements of relevant variables, where those of ordinary skill in the art will understand which variables to measure per node in the complex system and the applicable metrics to apply to each variable. For example, in a network environment, suitable metrics for a router may be packets received, packets sent, packets dropped, and collisions. Similarly, a workstation may monitor CPU load, outgoing packets, and incoming packets, in the processor and NIC, respectively.

According to embodiments, metrics may be selected to be monitored based on best practice standards 302, as are known to those of ordinary skill in the art. By utilizing best practice standards, in one aspect, only relevant metrics are monitored. Best practice metrics are selected to help predict specific abnormality states by gathering sets of precursor events for each specific abnormality.

After an appropriate metric for a variable is chosen, the appropriate thresholds must be set on a per metric basis to define variations from normal or expected values (i.e., abnormal states). The thresholds set may be static thresholds or dynamic thresholds when used in conjunction with a dynamic thresholding system, where the thresholds are utilized to identify specific abnormality states.

Once the topology is mapped and metrics decided upon, data collection module 300 collects data. These data, according to embodiments, are written to a database. Data collected may be used to generate heuristics, as well as for matching to previously generated heuristics in substantially real-time. In cases where the data is generated on proprietary devices or using proprietary software, a data import application programming interface (API) may be designed and implemented to pull the data from the relevant proprietary device. Data may need to be transformed and normalized prior to use by event prediction module 400.

Referring still to FIG. 1, collected data is fed into event prediction module 400, which forms the functional core of integrity management system 100. Event prediction module 400 comprises one or more submodules for creating heuristics and using the heuristics to match monitored data. By comparing the monitored data to heuristics generated from previously gathered data from prior variations that led to certain events (e.g., abnormalities, problems, etc.), according to embodiments, the integrity management system 100 is able to predict probabilities for potential events to occur based on observed variations from normal or expected values among the nodes prior to the actual occurrence of the event. According to other embodiments, application of the heuristics provides a tool for study of the interaction of the nodes within each complex system for greater understanding of the complex system as a whole.

In one aspect, an important characteristic of event prediction module is the ability to self-learn or to automatically generate truth rules about predicates using defined rule systems. These rules then form the cores of heuristics. As abnormality states are observed, heuristics are therefore both generated and improved. The system generates heuristics when new abnormality states occur. According to embodiments, previously defined heuristics are improved when previously observed abnormality states occur and are not flagged by the original heuristic. Whether generated or improved, the heuristic rules are created by observing metric data at one or more time slices prior to the abnormality's occurrence. In embodiments, a heuristic may also record metric data at the time the abnormality occurs, together with at least one set of data describing metric conditions prior to the abnormality.

According to embodiments, measurement of metrics by the integrity management system 100 is accomplished by recording the applicable data being measured by each metric over time. Database 350 records the data provided by each metric at each time slice. Data is retained in database 350 for an arbitrary time period, after which the data is archived or deleted, according to embodiments. Prior to recordation in the database 350, the data may be transformed or normalized. Alternately, the data from each metric may be recorded in the database 350 as raw values.

According to similar embodiments, only events are recorded in database 350, improving efficiency by recording only data associated with metrics observing abnormal variable behavior. Thus, as event prediction module 400 accesses the historical data in the database 350, the records obtained correlate only to the metrics observing abnormal behavior (i.e., where an event was recorded) prior to the abnormality.

Consequently, heuristics may be used to characterize the complex system in various ways depending on the heuristic, according to embodiments. For example, a fingerprinting system may take a fingerprint of events in a given device or transaction prior to the actual occurrence of a problem. When a statistically significant set of events occur that correspond with a previously captured fingerprint, a probability of an event occurring may be calculated, according to embodiments. Conversely, a dynamic thresholding system uses the actual data from each metric to monitor and adjust the dynamic thresholds on a per metric basis from time period to time period. Other modifications on this idea, including the combination of actual data and event data, may be used for each heuristic as would be known and understood by a person of ordinary skill in the art.

Referring still to FIG. 1, fingerprinting system 470 is included in the exemplary embodiment of integrity management system 100. Fingerprinting system 470 may include submodules, including fingerprint generation module 472 and fingerprint matching module 480. In one aspect, the fingerprint generation module 472 automatically captures a fingerprint of the transaction topology in the complex system, such as the transaction nodes in an IT infrastructure, at various time intervals prior to the occurrence of an event, such that the fingerprint provides an indication of the activity and operation of the complex system immediately preceding the event. The triggering of the capture of the fingerprint may be based on failures, hard threshold violations, defined transactions such as transaction slowdowns in the IT infrastructure, or user-provided occurrences.

In another aspect, the fingerprint is weighted and used to monitor complex system operation and activity to provide an indication of potential events before the events occur by matching substantially real-time data in the complex system against the fingerprint in the fingerprint matching module 480 to determine when the operation and activity on complex system appears similar to activity that previously resulted in a certain event. When it is determined that there is sufficient probability that a certain event will occur based upon the real-time data matching a previously generated problem fingerprint, an alert is generated to provide sufficient notification prior to the occurrence of the event. Based upon the comprehensive understanding of the interdependencies among all of the system components, the alert that is generated is able to specifically identify the root cause and location of the event so that the alert can be delivered to a target audience. The captured fingerprint is device independent so that it can be applied to other transactions and devices in the complex system.

An example of a fingerprint system that may be used as fingerprinting system 470 is disclosed in U.S. Pat. No. 7,707, 285, entitled, "System and Method for Generating and Using Fingerprints for Integrity Management," the contents of which are incorporated by reference in its entirety hereinabove. According to embodiments, fingerprinting system 470 may be used alone or in combination with other heuristics.

Another heuristic for providing the utility of integrity management system 100 is dynamic thresholding system 402. Like fingerprinting system 470, dynamic thresholding system 402 may be used alone or in combination with other heuristics. As opposed to static thresholding, dynamic thresholds are modified according to historical data. Naturally, as the state of a complex system changes or evolves, the dynamic thresholds also evolve and are updated to reflect the changed complex system parameters. For example, with information technology-type system, a dynamic thresholding system may observe increased bandwidth requirements consistent with growth of a company. Use of static thresholds might trigger an alert state be reporting abnormalities in bandwidth required. System administrators would then need to manually calculate and adjust the static thresholds consistent with the changed system requirements. However, a dynamic thresholding system, rather than creating an alert state, adjusts the thresholds by observing the bandwidth requirements over time and setting the dynamic thresholds consistent with the historical data patterns.

In one aspect, the dynamic thresholds are generated using previous data collected from the metrics of integrity management system 100. Generally, dynamic thresholding will be used in conjunction with time series data. Dynamic thresholds may be set as maximums, minimums, or ranges that model limits of normal behavior for a given metric. The set up of initial parameters for a dynamic threshold may be manually set or automatically generated after a certain volume of data is collected. The implementation of the individual dynamic thresholds will vary from case to case and will be well understood by a person of ordinary skill in the art. Data may be directly applied to the dynamic thresholds or it may be transformed using data analysis techniques, as would similarly be known to a person of ordinary skill in the art.

Figure 2:
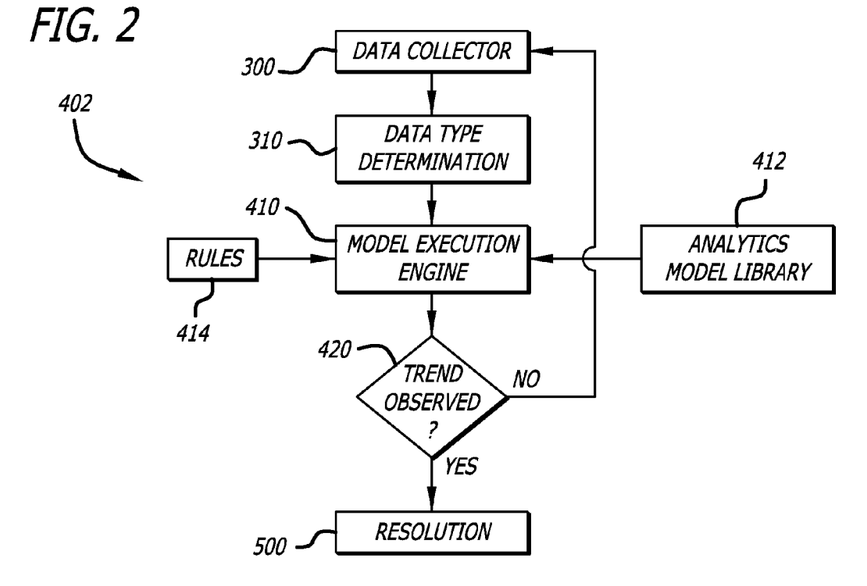
FIG. 2 is a block diagram of an embodiment of a dynamic thresholding system.

FIG. 2 exemplifies an embodiment of the dynamic thresholding system 402. As previously described, the data collection module 300 collects relevant data from the metrics. This data is stored in the database 350, where it is available to the dynamic thresholding system 402. The data type determination module 310 determines the type of data that has been collected.

Once the dynamic thresholding system 402 determines the applicable data type in the data type determination module 310, the data is fed to the model execution engine 410, which analyzes the data. Model execution engine 410 performs data analysis according to analytics models based on rules for each data type. The analytics model library 412 comprises a library of analytics models for data analysis that are utilized by the model execution library 410. For example, the analytics model library 412 may comprise analytic tools such as cluster analysis models, time series models, normalization models, and filtering models. Other models may also be included as would be known and understood by a person of ordinary skill in the art.

Analytics model library rules 414 provides to model execution engine 410 the analytics models to apply on a given data type and the order in which they should be applied. Analytics model library rules 414 may also define other relevant criteria necessary to perform analytics.

Once the rules are inputted, model execution engine 410 processes data through one or more of the models found in the analytics model library 412 as defined by the relevant rule or rules in analytics model library rules 414. After processing though model execution engine 410, these data are both stored and compared against existing thresholds. These data may be stored in database 350 (FIG. 1) or in other suitable places as would be known and understood to a person of ordinary skill in the art for later access.

Dynamic thresholds are generated using data from historical time periods to determine dynamic thresholds for normal behavior of a metric within the complex system. The historical time periods may be arbitrarily chosen, for example, from the data of the previous month, week, or day (or computed automatically) and used to reset or update the dynamic thresholds. Once the desired historical time period is determined, dynamic thresholds are calculated based on the data from the time period. Dynamic thresholds may be static values for a metric until they are updated using historical data; they may also vary as a function of time to model changes that occur within the particular metric as a function of time under ordinary behavior patterns.

Dynamic thresholding engine 402 determines new dynamic thresholds at predetermined time intervals. According to embodiments, dynamic thresholding engine 402 collects, evaluates, and determines new thresholds at midnight each night, using the prior 24 hours of historical data to determine the new thresholds. Other embodiments may reset the dynamic thresholds at other time intervals such as weekly, biweekly, or monthly, depending on the specific complex system for which it is implemented. Similarly, the historical time period from which the dynamic thresholds are calculated may also vary depending on the same criteria. Moreover, values for the updating interval and amount of historical data to incorporate into the dynamic thresholds may vary metric to metric, depending on the metric, the variable that it measures, and its node. For example, the air temperature in an ecosystem may widely vary in much shorter time intervals and require more frequent updating of the dynamic thresholds than a metric measuring the ground temperature, as a matter of efficiency.

Thus, the dynamic thresholding system disclosed herein is able to incorporate changes in behavior over time into the dynamic thresholds. This allows dynamic thresholding system 402 to evolve as the complex system evolves without the need of human intervention to reset the dynamic thresholds when a set of thresholds no longer accurately models ordinary behavior of the system. Moreover, by evolving the thresholding system, it will allow for sensitive thresholds to be set without creating undue false positive results.

Once dynamic thresholds are set, incoming data are compared to the thresholds. According to an embodiment, real-time data alarms are triggered only if they are perceived by dynamic thresholding system 402 to be trends 420. If a trend 420, then resolution module 500 is invoked, otherwise dynamic thresholding system 402 continues to collect data. This allows the thresholds to be set to accurately represent normal operating conditions with precision, and still allow for periodic spikes that exceed the dynamic thresholds, but are also consistent with normal operation of the complex system. For example, a network may occasionally experience spikes in bandwidth usage that exceed the threshold values for a time before returning to normal. Similarly, an animal may experience increased temperature due to a period of exercise that may exceed thresholds, but be consistent with normal operation. Likewise, traffic may slow down in a traffic system due to a car breakdown, which would periodically be expected as part of normal traffic patterns. These examples exemplify the types of potential thresholds spikes that may occur in complex systems as part of normal operation. Naturally, according to embodiments, threshold levels may be set to a point where spikes associated with normal operation do not exceed them. However, these types of thresholds have limited applicability due to their insensitivity to abnormalities that should otherwise cause an alert state, but do not trigger the alert state for failure to exceed the threshold.

Figure 3:
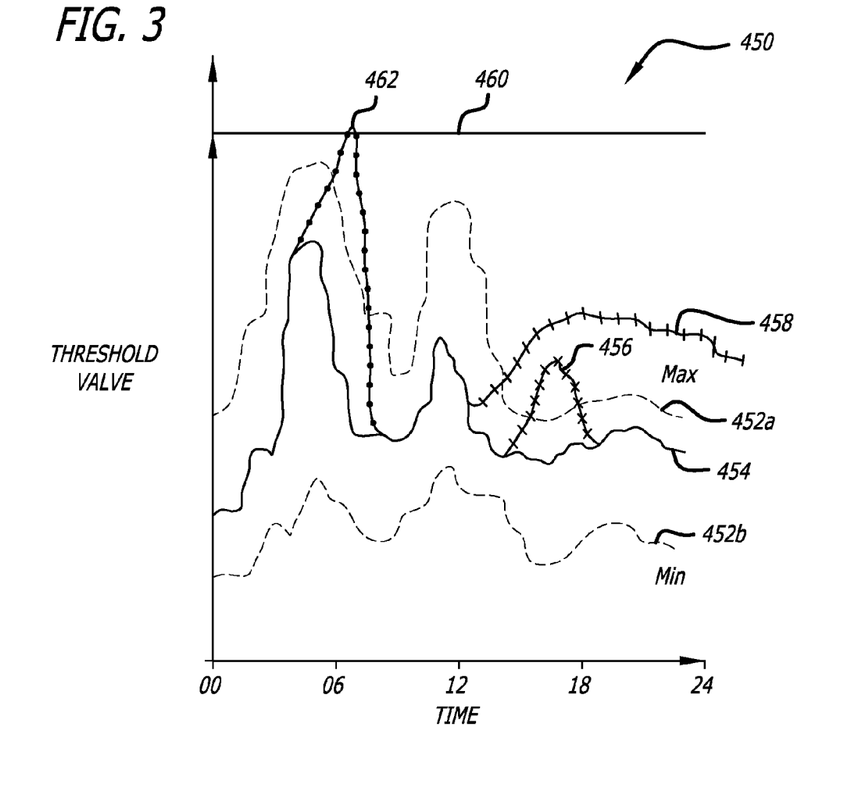
FIG. 3 is an illustration of an exemplary dynamic thresholding metric, showing both a normally occurring spike and an abnormal trend.

According to an embodiment of the operation of a dynamic threshold shown in FIG. 3, normally occurring spikes in the complex system may exceed the thresholding system without triggering an alert state. As shown in FIG. 3, there is shown an exemplary graphical illustration 450 with dynamic thresholds 452a, 452b for the metric over time that define a range of normal behavior. Dynamic thresholds 452a, 452b are reset at selected time intervals (e.g., nightly at midnight). They are based on the past normal operational performance of the metric, for example the last 90 days of historical data. As shown, a range is depicted with maximum threshold 452a and minimum threshold 452b. Thresholds may also comprise, instead of a range as depicted, only maximum threshold 452b or only minimum threshold 452a, according to embodiments on a per metric basis depending on the metric and the implementation for each metric.

Referring still to FIG. 3, there is shown real-time data history 454, which represents the actual values for real-time data as compared to dynamic thresholds 452a, 452b. As shown by real-time data history 454, real-time data stays within the dynamic thresholds 452a, 452b. Nevertheless, from time to time, the real-time data may exhibit varying behavior that exceeds threshold values, as shown by the different possibilities of a spike line 456, trend line 458, and hard threshold spike line 462.

Spike line 456 represents real-time data that spikes. These types of spikes represent ordinary and expect behavior of a complex system from time to time. Although spike line 456 exceeds dynamic threshold 452a, the behavior quickly returns below dynamic threshold 452a. The time period for which a spike may exceed the dynamic threshold may be chosen arbitrarily or decided upon based on the individual metric, as known to a person of ordinary skill in the art. The state represented by spike line 456 will not cause an alert state, according to embodiment. Rather, the behavior will be observed and accounted for as dynamic thresholds 452a, 452b are updated during each update cycle. These spikes are expected and are part of the driving force that allows the system to evolve as circumstances within the complex system change.

Unlike spike line 456, trend line 458 represents real-time data indicative of an event. As shown in FIG. 3, trend line 458 exceeds dynamic threshold 452a. Unlike spike line 456, trend line 458 stays above dynamic threshold 452a and does not return to a normal behavior level for a longer period of time. It will be clear to persons of ordinary skill in the art that the mere fact that trend line 458 continues to exceed dynamic threshold 452a is not per se indicative of an abnormality, but may represent a long-term spike. Nevertheless, once a trend is observed, dynamic thresholding system 402 treats it as an event and initiates an alert state of integrity management system 100. When dynamic thresholding system 402 is used in conjunction with fingerprinting system 470, trends may alert database 350 to trigger a fingerprint and used for later prediction of events rather than, or in addition to, creating an alert state in integrity management system 100.

The length of time for which a metric must exceed a threshold without returning to an ordinary operating value will depend on the metric, the measurement, and the degree of tolerance defined on a metric by metric basis. A person of ordinary skill in the art will understand and recognize these various criteria and implement them accordingly.

For example, if the complex system were a human according to an embodiment, the normal operating temperature may range from 36 C-38 C. The temperature may spike to 39 C from a few hours while the human hikes in a hot environment, which would not trigger an alarm. However, if the temperature rose above 38 C for greater than 12 hours, for example, an alert state would be activated, and may be indicative of a fever. Likewise, a pregnant woman may have an elevated temperature. However, her elevated temperature would be expected and the dynamic thresholds would adjust to reflect her modified temperature signature during the pregnancy.

In an information technology environment, according to an embodiment, a server's CPU load may be monitored. During the night, CPU load may drop considerably from daytime usage. However, spikes may occur as the CPU performs requested tasks, such as diagnostics. Such activities, although technically violating nighttime dynamic thresholds, may be consistent with ordinary CPU load. Similarly, a company might start using a night shift to increase productivity. Thus, the server CPU load might slowly increase as additional employees are brought in during nighttime hours. As the dynamic thresholds are recalculated periodically, the increased load will be reflected each time the dynamic thresholds update. The system, however, may also encounter dramatically increased server CPU loads that are unexpected, indicating a trend of increased server CPU loads. These loads might indicate an event and will trigger an alert state.

These examples demonstrate similar principles in many different complex systems. Artisans will appreciate the applicability of the present system, including dynamic thresholding system 402, to any number of known, discovered, recognized, or created complex systems from information technology applications including systems such as biological applications, traffic and weather pattern modeling and prediction, sports, gaming, and others as would be known to a person of ordinary skill in the art.

Referring again to embodiments represented by FIG. 3, hard threshold spike 462 may trigger an alert state regardless of whether it is a spike or a trend. Hard threshold 460 may be set based on any number of criteria, for example a service level agreement (SLA). Exceeding hard threshold 460 will trigger an alert state as soon as hard threshold 460 is exceeded. Hard thresholds, which represent traditional thresholding systems, may be arbitrarily chosen as a fail safe states. Hard thresholds may be chosen arbitrarily or defined as part of an SLA as a guaranteed performance metric, according to embodiments. Moreover, any number of hard and dynamic thresholds may be used for a metric with different results for observed spikes and trends consistent with this disclosure.

If an event that would otherwise be perceived by the system as a trend exceeds the hard threshold, then the system will likewise automatically trigger an alert state. Like the dynamic thresholds, violation of a hard threshold may also be sent to a fingerprinting system for a fingerprint in embodiments comprising both fingerprinting system 470 and hard thresholds.

Referring again to FIG. 1, integrity management system 100 sends alert states to resolution module 500 (also shown in FIG. 1). Resolution module 500 handles alert escalation workflow. From resolution module 500, alters may be routed to a dashboard where administrators of the complex system are alerted of a potential abnormality. From the dashboard, administrators may observe the criteria and metrics that are indicating an abnormality for optimization of the complex system, study of the system, or to resolve problems. Moreover, the administrators may be alerted to devices that are failing prior to complete failure. For example, increased hard disk drive seek time is observed consistently may indicate an impending failure and prompt a backup routine, as part of problem aversion module 510 according to the exemplary embodiment shown in FIG. 1.

Resolution module 500 may also notify interested parties by a messaging system such as email or simple messaging service (SMS) protocol. Having alerts sent to mobile device and other remote locations allows interested parties to be aware of potential abnormalities and address them. Similarly, it allows interested parties, such as administrators to take steps to alleviate the potential problems from remote locations. Similarly, according to an embodiment alerts generated using integrity management system 100 in the study of a complex system may help those studying the system to monitor the progress of the study. Likewise, prediction of weather or traffic patterns may be used to address the patterns or provide warnings, according to embodiments. Other, similar applications of integrity management system 100 are likewise contemplated for other complex systems as well.

In many cases, resolution module 500 may automatically invoke an abnormality aversion module 510, which takes steps to solve potential problems before they occur, for example. Abnormality aversion module 510 may comprise automated functions that respond to alert states to address particular abnormalities. For example, in a network environment, integrity management system 100 may observe indicia suggesting a large spike in bandwidth 30 minutes from the time of the alert. Resolution module 500 would then pass the alert to abnormality aversion module 510. Abnormality aversion module 510 may then execute a preprogrammed algorithm to bring additional servers online for added bandwidth capacity. Consequently, a potential bandwidth slowdown that would otherwise occur never occurs due to the increased capacity of the system. Moreover, the present example demonstrates further utility of integrity management system 100, that is, to provide additional efficiency capabilities that are inherent in a predictive system. In the example above, a company may save on resource usage by keeping unnecessary servers down until needed.

Nevertheless, many abnormalities will not have a type of response that is appropriate to feed to abnormality aversion module 510 for automated handling. Instead, direct intervention must be initiated to address the abnormality, for example in device failures. Escalation module 600 provides a platform for addressing these types of abnormalities. According to embodiments, escalation module sends alerts to human intervention systems, such as a problem ticketing system for troubleshooting.

The principles taught herein are applicable to many types of complex systems. Persons of skill in the art will reorganize the applicability of integrity management system 100 to computerized systems. However, the present system may also be applied to many other fields, as well. Examples include biological systems, ecological systems, weather, traffic, and sports predictions and patterns systems, and nearly other complex system wherein suitable variable may be identified and relevant metrics chosen. A person of ordinary skill in the art will understand that the exact metrics will be chosen and optimized on a case-by-case basis.

The present disclosure also discloses a method of detecting abnormalities in complex systems. According to an embodiment, integrity management system 100 is provided to monitor a complex system for abnormalities. Initially, integrity management system 100 discovers the nodes of the complex system. Discovery of the nodes may be accomplished with an automated probing system or arbitrarily defined manually, as previously described.

Once the nodes are discovered, their interconnectedness is determined. This may be done automatically, as would be known to artisans, or defined manually. The result is a topology of nodes and their interconnectedness. Data is then collected from the nodes. After a baseline of data is collected, one or more heuristics are determined using historical data. As additional data is collected throughout the life of each heuristic, the heuristics may be periodically adjusted as disclosed herein or as otherwise known to a person of ordinary skill in the art.

Each heuristic is applied to real-time data to determine the likelihood of potential abnormalities occurring. Examples of suitable heuristics are thresholding systems, dynamic thresholding systems, and fingerprinting systems. Where the integrity management system detects determines the probability of an abnormality is high enough, an alerting mechanism is activated for resolution of the potential abnormality prior to its actual occurrence.

In various embodiments, the integrity management system is operational in an IT infrastructure or with numerous other general purpose or special purpose computing system environments or configurations or other complex systems. Examples of well known computing systems, environments, or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, telephony systems, distributed computing environments that include any of the above systems or devices, and the like.

The integrity management system may be described in the general context of computer-executable instructions, such as program modules, being executed by a computer. Generally, program modules include routines, programs, objects, components, data structures, etc. that perform particular tasks or implement particular abstract data types. The system may also be practiced in distributed computing environments where tasks are performed by remote processing devices that are linked through a communications network. In a distributed computing environment, program modules may be located in both local and remote computer storage media including memory storage devices. The computer programs are stored in a memory medium or storage medium or they may be provided to a processing unit through a network or I/O bus.

In one aspect, the integrity management system includes at least one central processing unit (CPU) or processor. The CPU can be coupled to a memory, ROM or computer readable media containing the computer-executable instructions for generating and using fingerprints for integrity management. Computer readable media can be any available media that can be accessed by the system and includes both volatile and nonvolatile media, removable and non-removable media implemented in any method or technology for storage of information such as computer readable instructions, data structures, program modules or other data.

Computer storage media includes, but is not limited to, RAM, ROM, EEPROM, flash memory, portable memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by the fingerprint generation and matching systems. Combinations of any of the above should also be included within the scope of computer readable media. The computer readable media may store instructions or data which implement all or part of the system described herein.

Communication media typically embodies computer readable instructions, data structures, program modules, or other data in a modulated data signal such as a carrier wave or other transport mechanism and includes any information delivery media. By way of example, and not limitation, communication media includes wired media such as a wired network or direct-wired connection, and wireless media such as acoustic, RF, infrared and other wireless media.

While the apparatus and method have been described in terms of what are presently considered to be embodiments, it is to be understood that the disclosure need not be limited to the disclosed embodiments. It is intended to cover various modifications and similar arrangements included within the spirit and scope of the claims, the scope of which should be accorded the broadest interpretation so as to encompass all such modifications and similar structures. The present disclosure includes all embodiments of the following claims.

The invention claimed is:

1. A dynamic thresholding system comprising, in combination:
    a computer in data communication with an information technology infrastructure, the computer having:
        a data collection module that collects metric data and stores the metric data on a storage device from at least one metric in the information technology infrastructure; and
        a dynamic threshold generator for creating a dynamic threshold based on a set of historical metric data, comprising:
    a model execution engine for analyzing the historical metric data based on at least one analytics model in an analytics model library;
        an analytics model library rule that defines parameters used by the model execution engine to form a transformed metric data set; and
        a trend detecting module for detecting a trend, the trend occurring when incoming metric data substantially exceeds the dynamic threshold for a predetermined number of time slices;
    wherein the dynamic threshold generated from the dynamic threshold generator is not static from one time slice to another time slice; and
    wherein a resolution module causes an alarm when a trend is detected.

2. The system of claim 1, further comprising a data type determination module.

3. The system of claim 1, wherein new dynamic thresholds are determined at predetermined time intervals.

4. The system of claim 1, further comprising an event prediction module.

5. The system of claim 1, further comprising a resolution module.

6. The system of claim 1, wherein the parameters comprise definitions for applying the analytics models to a data-type and an order in which analytics models should be applied to the set of historical data.

7. A non-transitory machine-readable medium having instructions stored thereon executable by a processing unit comprising:
    using a computer to:
        collect data from at least one metric in an information technology infrastructure and store the data;
        transform the data with at least one model from an analytics model library and at least one model library rule and storing the transformed data in a set of historical transformed data;
        determine a dynamic threshold for the at least one metric on a time slice by time slice basis by using the set of historical transformed data to generate a value describing a limit of normal functionality for each time slice; and
        modify the dynamic threshold periodically to reflect recent historical transformed data by replacing old data with more recent historical data in the set of historical transformed data.

8. The non-transitory machine-readable medium of claim 7, further comprising comparing the data collected from the at least one metric to a dynamic threshold existing at about the same time period in which the data collected from the at least one metric is collected.

9. The non-transitory machine-readable medium of claim 7, further comprising comparing the transformed data to a dynamic threshold corresponding to the same time period in which the data collected from the at least one metric used to transform the transformed data was is collected.

10. The non-transitory machine-readable medium of claim 9, further comprising triggering an alert state when the value of the transformed data exceeds the dynamic threshold for a predetermined period of time.

11. The non-transitory machine-readable medium of claim 10, wherein the alert state is triggered when the value of the incoming metric data exceeds a hard threshold.

12. The non-transitory machine-readable medium of claim 7, further comprising determining the type of the data collected from the at least one metric.

13. The non-transitory machine-readable medium of claim 7, further comprising triggering an alert state when the value of the data collected from the at least one metric exceeds the dynamic threshold for a predetermined period of time.

14. The non-transitory machine-readable medium of claim 13, wherein the alert state is triggered when the value of the data collected from the at least one metric exceeds a hard threshold.

15. A non-transitory machine-readable medium having instructions stored thereon executable by a processing unit comprising:

using a computer to:

collect data from at least one metric in an information technology infrastructure and store the data;

transform the data with at least one model from an analytics model library and at least one model library rule and storing the transformed data in a set of historical transformed data;

determine a dynamic threshold for the at least one metric on a time slice by time slice basis by using the set of historical transformed data to generate a value describing a limit of normal functionality for each time slice;

modify the dynamic threshold periodically to reflect recent historical transformed data by replacing old data with more recent historical data in the set of historical transformed data;

comparing incoming metric data against the dynamic threshold for the corresponding time slice in which the incoming metric data is collected; and triggering an alert state when a trend is observed, wherein the trend comprises the value of the incoming metric data exceeding the dynamic threshold for a predetermined period of time.

16. The non-transitory machine-readable medium of claim 15, further comprising comparing the transformed data to a dynamic threshold existing at about the same time slice in which the data collected from the at least one metric was collected.

17. The non-transitory machine-readable medium of claim 15, wherein the alert state is also triggered if the value of the incoming metric data exceeds a hard threshold.

* * * * *